(12) United States Patent
Lundquist et al.

(10) Patent No.: US 7,424,223 B1
(45) Date of Patent: Sep. 9, 2008

(54) RECONFIGURABLE WAVELENGTH BLOCKING APPARATUS AND OPTICAL SELECTOR DEVICE THEREFORE

(75) Inventors: Paul Lundquist, San Jose, CA (US); Denis Zaccarin, San Jose, CA (US)

(73) Assignee: Ciena Corporation, Linthicum, MD (US)

( * ) Notice: Subject to any disclaimer, the term of this patent is extended or adjusted under 35 U.S.C. 154(b) by 486 days.

(21) Appl. No.: 10/896,284

(22) Filed: Jul. 22, 2004

Related U.S. Application Data

(60) Provisional application No. 60/492,114, filed on Aug. 4, 2003.

(51) Int. Cl.
*H04J 14/00* (2006.01)
*G02B 6/28* (2006.01)

(52) U.S. Cl. .......................... 398/49; 385/24
(58) Field of Classification Search ............. 398/49, 398/79; 385/24
See application file for complete search history.

(56) References Cited

U.S. PATENT DOCUMENTS 6,255,642 B1 * 7/2001 Cragg et al. ............ 250/216
6,519,059 B1 * 2/2003 Doerr et al. ............ 398/83
2002/0131684 A1 * 9/2002 Doerr ...................... 385/24
2003/0081888 A1 * 5/2003 Doerr ...................... 385/24
2004/0213566 A1 * 10/2004 Takanashi et al. ......... 398/32

* cited by examiner

*Primary Examiner*—Jason Chan
*Assistant Examiner*—Quan-Zhen Wang
(74) *Attorney, Agent, or Firm*—Clements Bernard Miller; Christopher L. Bernard; Tyler S. Brown (57) ABSTRACT

An optical selector device is disclosed that includes a first arrayed waveguide grating (AWG) demultiplexing an input WDM signal and outputting demultiplexed signals on respective outputs; an array of optical shutters optically coupled to the outputs from the first AWG; a second AWG optically coupled to the array of optical shutters, the second AWG multiplexing optical signals output from the array to form a WDM signal; and a common optical shutter optically coupled to either of the first and second AWGs. The common optical shutter has a default state that is substantially opaque to the WDM signal. Additionally, the array of optical shutters may have a default state that is substantially transparent to the demultiplexed signals. A reconfigurable wavelength blocking device incorporating the optical selector device is also disclosed which additionally includes a controller that controls the optical shutter array to selectively block/pass designated wavelength channels or bands.

17 Claims, 8 Drawing Sheets

RECONFIGURABLE WAVELENGTH BLOCKING APPARATUS AND OPTICAL SELECTOR DEVICE THEREFORE

This Nonprovisional application claims priority under 35 U.S.C. § 119(e) on U.S. Provisional Application No. 60/492,114 filed on Aug. 4, 2003, the entire contents of which are hereby incorporated by reference.

BACKGROUND OF THE INVENTION

Optical communication networks conventionally use wavelength division multiplexing (WDM) technology to increase the bandwidth being carried by the network. As is well known, such WDM technology generally includes transmitting a plurality of distinct wavelengths each of which carries data. These wavelength channels are optically combined and transmitted over an optical fiber to a receiver where they may be demultiplexed into separate wavelengths that may be detected to recover the data.

In recent years, the number of wavelengths (channel count) has increased dramatically.

Furthermore, typical optical networks are now quite dynamic in that various wavelength channels may be added, dropped, or selectively switched at various points in the network. Such dynamic networks have a need for channel filters, particularly dynamic channel filters than can selectively transmit or block certain wavelength channels upon command.

This need has driven the invention of so-called reconfigurable blocking filters (RBFs) such as those described in U.S. Pat. Nos. 6,141,361; 5,974,207; 5,960,133. Such dynamic channel filtering can also be accomplished with so-called optical router technology as described in, for example, U.S. Pat. Nos. 6,625,346 and 6,687,431.

A typical application of such reconfigurable blocking filters and optical routers is within an optical add/drop multiplexer (OADM) in which the RBF or wavelength router is placed along the express path of the OADM so as to selectively pass or block certain channels. Channels are typically blocked along the express path of an OADM in order to permit the insertion of wavelength channels having the same wavelength. More specifically, wavelength channels are typically dropped at an optical node which leaves that bandwidth available for the insertion of other data at the same wavelength.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of the invention refers to the accompanying drawings.

The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices. Likewise, the expressions "connection" and "operative connection" as used herein are relative terms and do not require a direct physical connection.

Figure 1:
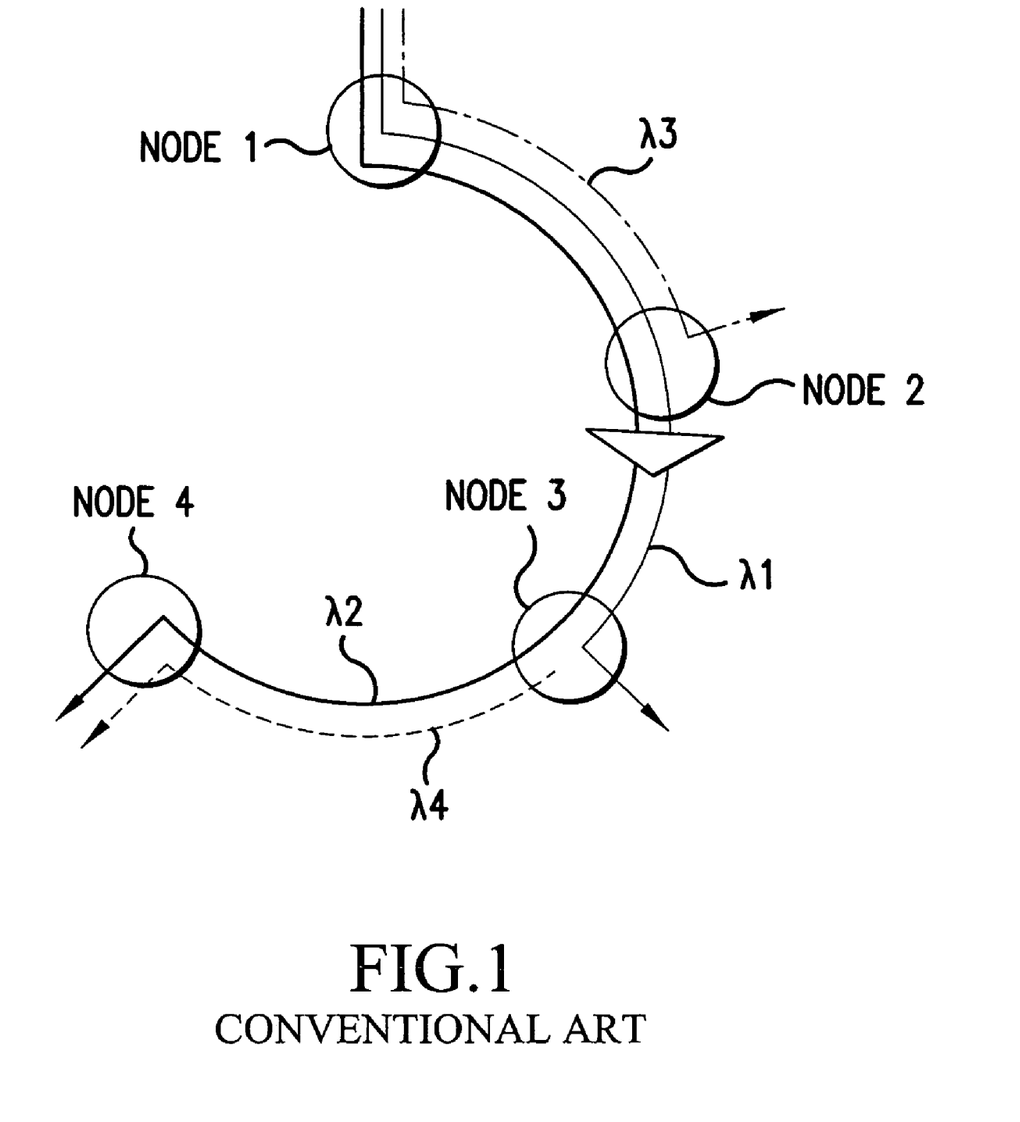
FIG. 1 is a high-level diagram of a conventional optical network useful for illustrating the concept of dropping and adding wavelength channels.

Before turning to the details of the invention, FIG. 1 will be utilized to illustrate the typical but non-limiting application of the invention. Specifically, FIG. 1 shows a conventional optical network having nodes 1, 2, 3, and 4. This optical network is carrying four wavelength channels $\lambda 1$, $\lambda 2$, $\lambda 3$, and $\lambda 4$.

Each of these wavelength channels originates at a different point and is dropped at a different point in the network. At node 3, wavelength channel $\lambda 2$ is added to the network at node 1 and is dropped at node 4. Wavelengths channel $\lambda 3$ is added at node 1 and dropped at node 2. Wavelengths channel $\lambda 4$ originates at node 3 and is dropped at node 4. Wavelengths channel $\lambda 1$ is added at node 1 and dropped at node 3. Thus, it can be seen that at node 3 certain wavelength channels must be transmitted or passed through while certain channel(s) must be dropped.

A conventional optical selector device can be used to drop $\lambda 1$ while allowing $\lambda 2$ to continue. A fixed optical filter can be utilized for this purpose. Such a fixed optical filter for dropping $\lambda 1$ while allowing $\lambda 2$ to continue has quite limited functionality and does not permit the dynamic passing and dropping of channels on demand.

The invention described below solves this problem by providing a reconfigurable wavelength blocking apparatus that may be utilized in, for example, a reconfigurable optical add/drop multiplexer (ROADM). As will be explained below in detail, the inventive reconfigurable wavelength blocking apparatus can dynamically choose which wavelength will be blocked and which wavelengths channels will be permitted to pass through largely unaffected.

Figure 2:
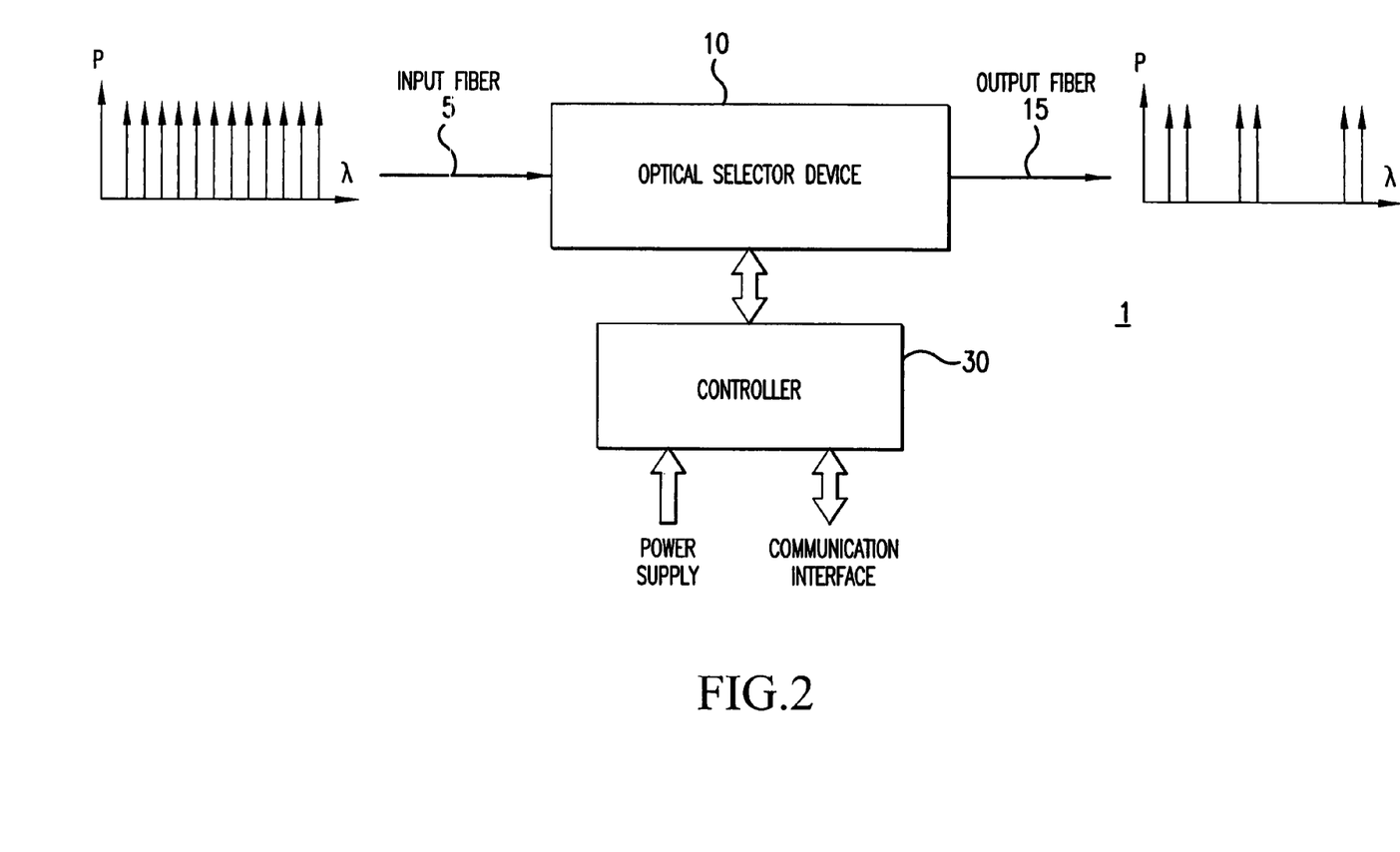
FIG. 2 is a high-level block diagram of a reconfigurable wavelength blocking apparatus according to the invention and further illustrating the effect of the invention on wavelength channels being input thereto.

FIG. 2 illustrates the reconfigurable wavelength blocking apparatus 1 according to the invention. As shown therein, the reconfigurable wavelength blocking apparatus 1 may input a plurality of WDM channels on input fiber 5 some of which are blocked and some of which are permitted to pass through largely unaffected on output fiber 15. This selective wavelength blocking and passing is graphically illustrated in FIG. 2 which shows 12 WDM channels at the input and 6 channels at the output.

More specifically, the reconfigurable wavelength apparatus 1 according to the invention generally includes an optical selector device 10 that optically selects which WDM channels should be blocked and which should be permitted to pass through. This optical selector device is operatively connected to a controller 30 as shown.

The controller 30 may also be connected to a power supply and communication interface as shown. The optical selector device 10 has no power requirement itself but is driven by transducer signals as further explained below in detail. Further details of the optical selector device 10 and controller 30 are provided below in relation to FIGS. 3-8.

Generally speaking, the functionality of the reconfigurable wavelength blocking apparatus 1 is to block one or multiple channels or groups of channels from the input fiber 5 so that the output fiber 15 does not contain the same set of channels or group of channels as the input fiber. The invention is insensitive to data rate, data format, analog or digital signals, etc. Other factors such as number of channels and channel spacings may be accommodated by appropriate design of the invention as further described below.

Figure 3:
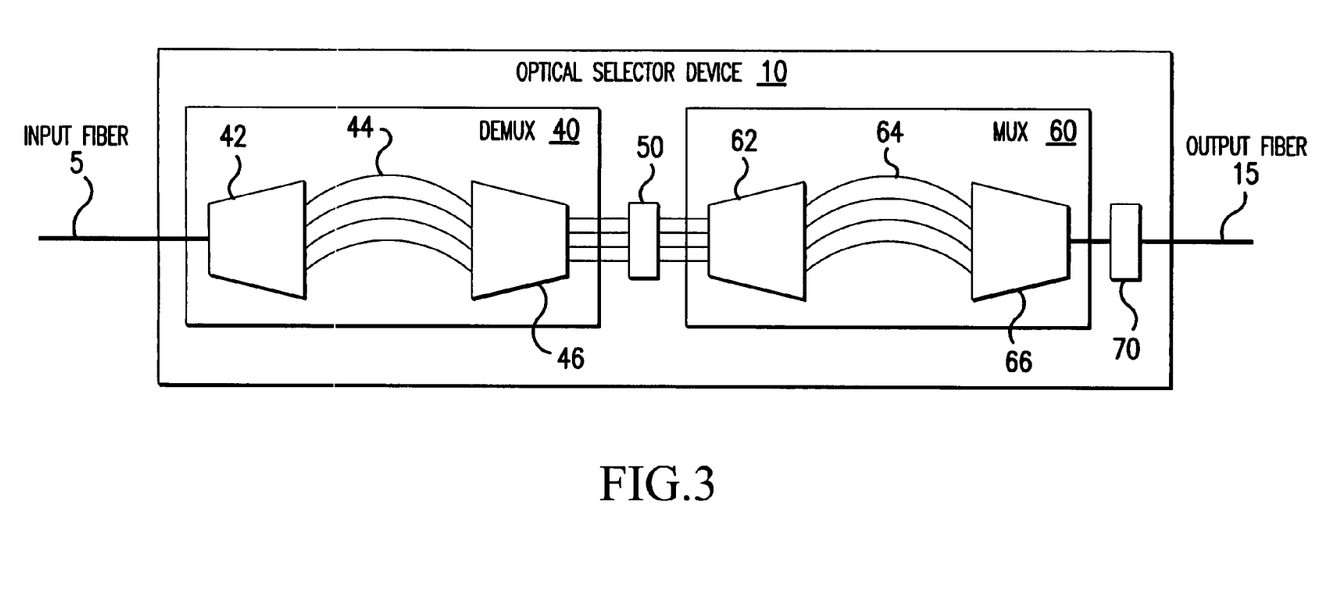
FIG. 3 is a block diagram of an optical selector device according to the invention and generally illustrating the overall construction of the optical selector device itself.

FIG. 3 illustrates further details of the optical selector device 10 according to the invention. As shown therein, the optical selector device 10 includes three main components, namely a demultiplexer 40, an optical shutter (OS) array 50, multiplexer 60 and common optical shutter 70.

As also shown, an input fiber 5 may be used to supply the input WDM signal to the demultiplexer 40. Likewise, an output optical fiber 15 may be utilized to output the processes WDM signal.

Both the demultiplexer 40 and multiplexer 60 are preferably constructed utilizing arrayed waveguide grading (AWGs). Such AWGs, are conventional devices, in and of themselves, that are typically applied to both demultiplex and multiplex WDM channels. As further shown in FIG. 3, the demultiplexer 40 AWG includes a so-called slab 42 optically coupled to substantially parallel waveguides 44 each differing in length from its nearest neighbors. These waveguides 44 optically couple into another slab 46. The construction of the AWG in the Demux 40 is conventional such that further description is unnecessary.

The AWG Demux 40 outputs demultiplexed wavelengths channels on separate waveguides 49 to the optical shutter array 50 the output of which is optically coupled to the multiplexer 60 via another set of waveguides as shown in FIG. 3.

The multiplexer 60 is another AWG device including slabs 62, 66 interconnected by substantially parallel waveguides 64 having different lengths. The multiplexer 60 optically combines the demultiplexed channels that have been processed by the optical shutter array 50.

A common optical shutter 70 is optically coupled to the output of the multiplexer 60 or alternatively to the input of demultiplexer 40. In another alternative, the common optical shutter 70 may be provided at both the output of the multiplexer 60 and to the input of the demultiplexer 40. This common optical shutter 70 receives all of the WDM channels and can affect the optical power of all of these channels in a manner that will be described in more detail below.

It is important to note that the demultiplexer 40 and multiplexer 60 are not limited to single channel granularity. In other words, the demultiplexer 40 may demultiplex the WDM channels into individual channels or bands or groups of channels. Likewise, the multiplexer 60 may multiplex individual wavelength channels or bands of channels as is known in the art. Preferably, the granularity of the demultiplexer 40 and multiplexer 60 should match.

The optical selector device 10 is preferably constructed as a planar device on a single substrate. This may be done using so-called planar lightwave circuit (PLC) technology which is a general term that describes an optical module that combines a plurality of individual optical and electronic devices that are integrated onto a planar substrate. Such PLC technology is conventional in and of itself but is utilized to advantage by the present invention. Utilizing such PLC technology, light is routed between devices by optical waveguides that are constructed directly onto the substrate. Individual devices such as optical shutters and arrayed waveguide gratings may be integrated into a single PLC device. In addition, it is also possible to integrate control circuitry on the same substrate as the optical components using conventional techniques and this alternative is within the scope of the invention.

Commercially available PLC technology typically utilizes silicon as the substrate because it leverages the vast amount of technological expertise and processing equipment that are based on silicon thin film devices. A few commercial PLC technology efforts have been based upon glass or other substrate materials and the invention is certainly not limited to silicon substrates. Indeed, as technology develops other substrate materials may be utilized to advantage.

For silicon substrates, in general a thin layer of silicon dioxide $SiO_2$ is used as a buffer and a waveguide material is deposited on top of this buffer layer. The most commonly used waveguide materials are silicon and silicon dioxide $SiO_2$. Both offer relatively low transmission loss, but the extremely high refractive index of silicon causes these waveguides to have much higher optical insertion losses than $SiO_2$.

Figure 4:
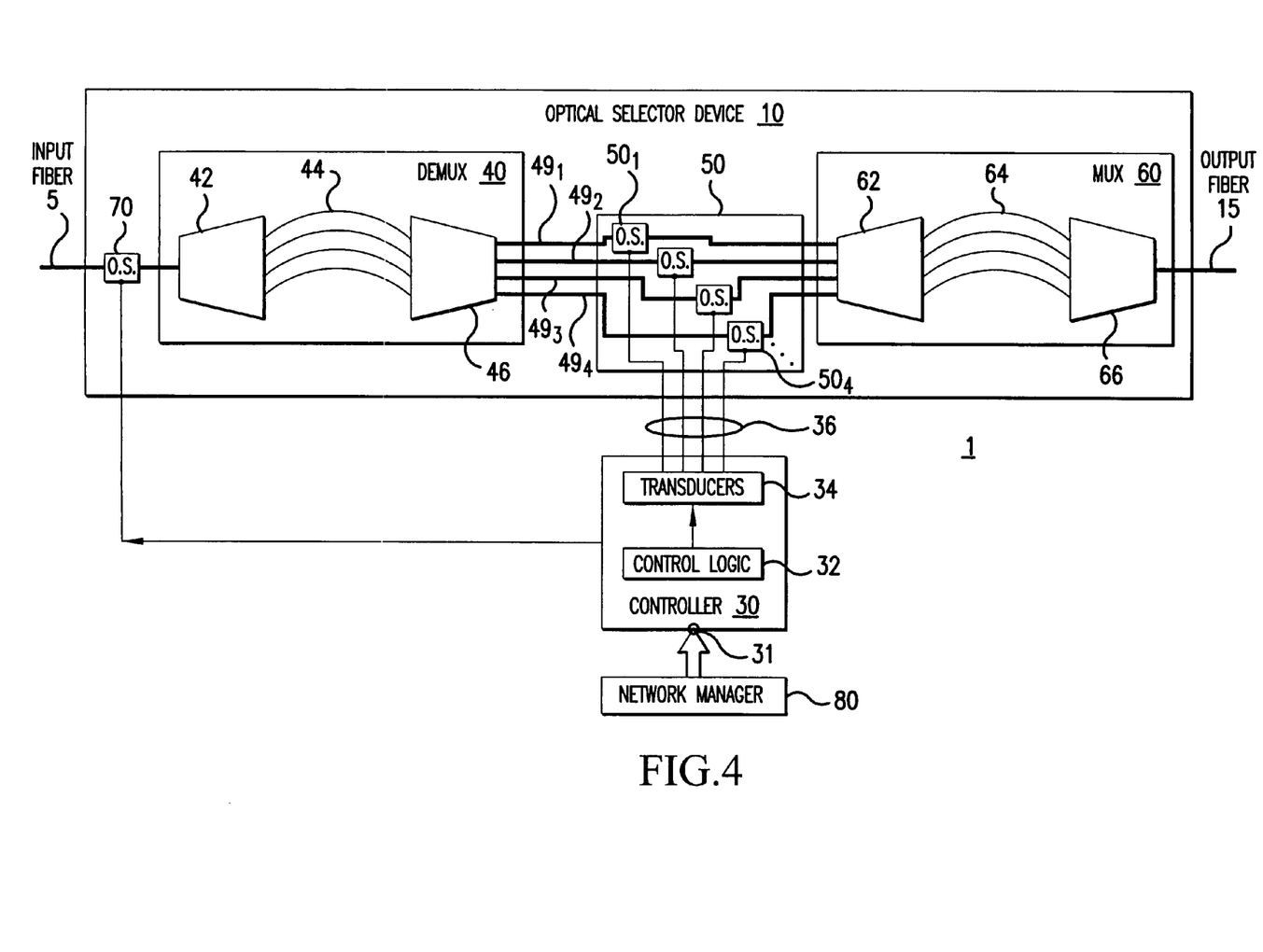
FIG. 4 is a block diagram of a reconfigurable wavelength blocking apparatus according to the invention and further illustrating additional details of the inventive optical selector device and controller.

FIG. 4 shows further details of the optical selector device 10. As shown therein, the optical shutter array 50 includes an array of individual optical shutters $50_1, 50_2, 50_3$, and $50_4$. As indicated by the ellipsis, the optical shutter array 50 is not limited to four elements and may be expanded to increase the number of channels (or bands) that may be selectively passed through or blocked by the invention. Furthermore, the number of optical shutters $50_n$ within the array 50 may be as few as two but typically this optical shutter array will have at least eight optical shutters $50_n$. Each of the individual optical shutters $50_n$ within the array 50 are individually optically coupled to optical waveguides. For example, optical shutter $50_1$ is optically coupled to optical waveguide $49_1$. Likewise for the other optical shutters in the array 50. Each of the optical shutters $50_1$ also has a control input receiving a control signal from the controller 30 as further described below.

A common optical shutter 70 may be provided at the input to the optical selector device 10 as shown in FIG. 4 or at the output of the optical selector device 10 as shown in FIG. 3. In other words, the position of the common optical shutter 70 is flexible in that it may be placed at either the input or the output of the optical selector device 10 or both. The common optical shutter 70 also has a control signal input and receives a control signal from the controller 30 as further discussed below.

An optical shutter is a device that is used to completely block light. It has two states; transparent and blocking. In the transparent state, light is passed through the device with minimal distortion. In the opaque state, light is blocked completely, or as much as possible.

In the preferred embodiment, the optical selector device 10 is constructed utilizing planar lightwave circuit technology. In such a case, the optical shutters $50n$, 70 are also constructed using known PLC techniques. Generally speaking, an optical shutter is anything that switches all, or close to all, of the incoming light on and off. A variable optical attenuator (VOA) with 10 dB dynamic range cannot effectively be used as a shutter, but if 2 or more of them are placed consecutively the series of VOAs can be used together as a shutter.

A VOA can be used as a shutter if its dynamic range is large enough, or a series of consecutive VOAs can be used as a shutter if the dynamic range of one is not large enough. For any VOA that is used to adjust optical power, the PDL will be important. When used as a shutter, the PDL of the VOA(s) used for the optical shutter will be unimportant. Moreover, there are many optical shutter designs that are completely unrelated to any VOA, such as the Oplink shutter as well as other commercially available alternatives all of which are included within the scope of technology that can be used as an optical shutter. The invention generally prefers to use a PLC VOA/shutter because it is easy to integrate onto the Si substrate along with the AWGs.

A number of approaches can be used to incorporate optical shutter devices into a PLC optical module such as optical selector device 10. Among the most effective technologies are electro-absorption, mode conversion, and interferometry. An electro-absorption shutter blocks the incident light by the use of electrical current injection into the waveguide region, which causes the light to be absorbed. The amount of current injected must be sufficient to absorb all of the light, or at least enough light to achieve the shutter functionality.

Mode-conversion devices work by altering the waveguide propagation characteristics of a portion of the guide such that the light is not guided and leaks into the cladding regions. This alteration is typically achieved by either applying a DC voltage across some part of the waveguide geometry to vary the refractive index through the electro-optic effect, or by actuating a heater or TEC (thermal-electro cooler) to adjust the temperature of critical sections of the waveguide and adjusting the refractive index via the thermo-optic effect. In either case, the propagation mode properties are altered such that light is not guided and thus blocked from further transmission within the device.

Finally, an optical shutter ($50_n$ and 70) can be constructed from a Mach-Zhender interferometer, with the optical path length of one or more arms adjusted by changing the temperature of the guiding arm. If the thermoelectric effect is used to change the optical path length, the change in refractive index is typically very asymmetric and the Polarization-Dependent Loss (PDL) is often a performance constraint. A second design constraint is electrical power dissipation, because the amount of electrical current required will increase with the amount of refractive index adjustment required.

An interferometric shutter may be used for optical shutters ($50_n$ and 70) with only one input guide and one output guide, with the waveguide split into two legs and then recombined. The refractive index of one or both arms is adjusted between two states; transparent and opaque.

In the invention, PDL is not an issue since the function of the shutters ($50_n$ and 70) is to either let light pass through undisturbed, or to block it completely. The device structure (the lengths of the two arms) can be chosen such that the default state (no current passing through the heater) is either transparent or opaque, such that the high current state (maximum electrical power dissipation) is also either transparent or opaque. Thus, the device design can be chosen such that the optical shutter has a default transparent or default opaque state the purpose of which will be explained below in detail.

The general design of a thermoelectric PLC optical shutter that is preferably used for optical shutters $50_n$ and 70 is comprised of a two stage Mach-Zhender interferometer each stage of which has one input and one output arm. Here the output power is adjusted by tuning the difference between the two arms in a precise way. In most design strategies the goal is to minimize PDL while maximizing attenuation Dynamic Range (DR). Since the PDL will typically vary nonlinearly with increasing refractive index change, it can be advantageous to design such optical shutters with multiple interferometer stages.

Further design details and constraints for the AWGs used to construct the Demux 40 and Mux 60 are provided below.

AWGs as discrete devices are conventionally used to add/drop optical channels to/from a DWDM fiber (Mux/Demux device). Key technical performance parameters are Bandwidth and Isolation, which are closely related. Wide bandwidth is desirable to avoid removing frequency content from the data waveform. High Isolation is desirable to diminish unwanted channel signals from leaking into the desired channel. These two parameters cannot be optimized independently, typically improvement in one comes at the expense of the other.

The bandwidth/isolation requirements are in general different for discrete Mux and Demux devices. For a Demux which is used to drop channels, Isolation is a critical parameter and bandwidth may be less important, although it is still desirable to avoid attenuating any frequency content from the dropped signal. For a Mux that is used to add channels, Bandwidth is typically the more crucial of the two.

The requirements for a optical selector device 10 according to the invention are distinct from those for a discrete Mux or Demux, because in many applications the inventive device 1 would need to be cascaded. A discrete Demux filter will typically not be cascaded throughout a transmission link. If it were cascaded, the bandwidth would need to be somewhat wider because its effects would accumulate. Thus, in an AWG-based reconfigurable wavelength blocker device 1 the individual AWG filters (Mux 60 and Demux 40) should preferably be optimized if the device 1 is intended to be cascaded, with more emphasis on wider bandwidth and less emphasis on Isolation.

The Isolation requirement is more complicated than for standard Demux applications because in this wavelength blocker device 1 the optical channels are divided and then recombined in a single chip. In this case the imperfect Isolation will cause faint replicas of various channels to be recombined in the main output fiber after leaking through various optical paths in the shutter array. These faint replicas are not important in typical applications of discrete AWG devices, but here they will accumulate as reconfigurable wavelength blocker devices 1 are cascaded.

If the magnitude of these replicas is not limited sufficiently they will cause coherent crosstalk, because they have the same wavelength as the original signal channel and will not be removed by any wavelength filter before that channel is assigned to a downstream receiver. A typical limitation on coherent crosstalk at a receiver is roughly 25 dB. Thus the allowable coherent crosstalk from the reconfigurable Wavelength Blocker device 1 will limit the number of devices that can be cascaded, since the coherent crosstalk could accumulate in a linear manner.

Finally, since in an AWG-based Wavelength Blocker 1 two AWGs (40, 60) are fabricated onto the same substrate, their properties can be selected in conjunction with each other to optimize overall performance. In discrete AWG Mux and Demux devices the performance must be considered separately, and in any optical transmission system mix-and-match penalties and design tolerances must be considered. In the invention, with Mux 60 and Demux 40 preferably fabricated onto a single chip, the overall behavior can be designed to achieve the device goals, and the parameters of the two filters can be selected with this in mind. In some aspects the Bandwidth and Isolation can be considered in tandem. This can simplify the Design as well as the device testing required, and may result in improved yields by relaxing process tolerance requirements.

As further shown in FIG. 4, the reconfigurable wavelength blocking apparatus further includes a controller 30. Generally speaking, the controller 30 may be constructed utilizing digital or analog circuitry. Digital techniques including a microprocessor and associated elements such as memory are generally preferred, particularly for the control logic 32. The controller, and specifically the control logic 32 may be constructed utilizing a variety of digital circuits including, but not limited to a general purpose microprocessor program as described below, an application specific integrated circuit (ASIC) designed according to the functionality described below, an FPGA (field programmable gate array) or other digital techniques now known or developed in the future. The controller 30 generally includes two major components: the control logic 32 (which is programmed according to the description below and further described in FIGS. 6 and 7) and the transducers 34.

In general, the control logic 32 serves as the brain of the reconfigurable wavelength blocking apparatus 1. More specifically, control logic 32 may receive commands or instructions from network manager 80 via a control signal input port 31. The control logic 32 may utilize these commands or instructions from the network manager 80 in order to command the transducers 34 which drive the optical shutters of the array 50 and common optical shutter(s) 70 as further described below.

A network manager 80 is a conventional interface provided in most optical communications networks. A network manager 80 may be a centralized network management system or console that centrally manages an entire optical network or a portion thereof. The network manager 80 may also be regional or local depending on the size or complexity of the optical network being controlled.

Alternatively, the network manager 80 may be a so-called craft interface typically utilized by a technician or other operator to command the network.

The network manager 80 may communicate to the control signal input port 31 of controller 30 via various communication means such as conventional optical service channels, overlay IP networks, overhead data such as SONET or SDH overhead information contained in main data channels or in the service channel or may be a direct connection via a wire such as an Ethernet cable or other protocol or connector.

Network manager 80 may operate according to an overall network control scheme, regional control scheme, or local control scheme. More importantly, network manager 80 decides which channels should be blocked and which channels should be passed through the reconfigurable wavelength blocking apparatus 1.

In yet another alternative, the functionality of the network manager 80 may be incorporated within the reconfigurable wavelength blocking apparatus 1 itself and may make decisions based on certain alarms, errors or other conditions local to the node in which the device 1 resides. Such high-level control is not a main focus of the present invention. Instead, the invention responds to decisions made by the network manager 80 by selectively blocking or passing certain channels as they pass through the reconfigurable wavelength blocking apparatus 1.

The transducers 34 may be constructed according to conventional techniques and devices the particular construction of which will vary according to the particular technology utilized for the optical shutter array 50 and the common optical shutter 70. Such transducers 34 are conventional in and of themselves and one of ordinary skill in the art would well know how to construct the transducers 34 once the particular technology for the optical shutters is selected.

As shown in FIG. 4, the transducers 34 may provide a parallel output via signal lines 36 such that each control signal line in the parallel data path 36 is individually supplied to the optical shutters $50_1, \ldots 50_n$ to provide individual control of the optical shutters in the array 50. Alternatively, a serial interface may be utilized instead of the parallel interface shown in FIG. 4. Such a serial interface is a conventional element that could be constructed utilizing known techniques. More important is that control signals are supplied by the transducers 34 that control the light transmission/blocking properties of the optical shutters in the array 50 and in the common optical shutter 70.

Default Opaque and Default Transparent Optical Shutter States

Significant components of the present invention are the default states for the optical shutters utilized in the optical shutter array 50 and in the common optical shutter 70. These default states are explained below in detail.

The default state of a optical shutter device is typically defined to be either transparent (maximum transmission) or opaque (maximum attenuation). This definition is a result of the construction of fabrication of the optical shutter. The default state will occur if the optical shutter device loses electrical power due to equipment failure or some other cause. Optical transmission system architectures vary in structure, and different optimum default states are indicated for different types of systems. Approaches based on point-to-point transmission links may have little need for a particular default state if the signals pass through optical amplifiers that will go dark anyway if power is lost at the node location, or the requirement may be default transparent if the rest of the node is designed to pass through the traffic if at all possible when power is lost.

In general, dynamic transmissions systems having numerous added and dropped channels in most nodes will benefit from devices such as optical shutters that become opaque if control is lost. One reason is to prevent duplication of a wavelength channel. An optical shutter or other device may be used to squelch a particular wavelength that is reused downstream in the network. If the optical shutter loses power for any reason and becomes transparent, the unwanted signal that was intended to be squelched could prevent the intended channel from being transmitted successfully.

Another reason for a default opaque state is fault isolation and signaling. The ability of a transmission network to respond to failures of many types is a critical performance factor. If power is lost at a node, or if a failure on a control circuit causes a optical shutter or other device to revert to its default state, it is in many cases advantageous to squelch the unreliable signal and allow conventional LOS (loss of signal) detection equipment within the network to either reroute traffic or to initiate signaling and alarms that will indicate the problem as quickly as possible.

In the present invention the most important default state from an operational standpoint is for the common optical shutter 70 to have a default opaque state. In other words, the initial construction or fabrication of the common optical shutter 70 should be such that when power is not being supplied to the common optical shutter 70 then the default (power-off) state should be a blocking or opaque state.

In contrast, the default state for each of the optical shutter $50_1 \ldots 50_n$ in the optical shutter array 50 is preferably a default transparent state. In other words, when power is not being supplied to the optical shutter array 50, the optical shutters $50_n$ in the array should be substantially transparent or otherwise be in a state that substantially transmits light passing there through. The key advantage to the optical shutter array 50 default transparent state is that such a default states minimize power consumption. Indeed, the optical shutter array 50 may have a large number of individual optical shutters $50_1 \ldots 50_n$ each one of which consumes power. Having a default transparent state for the optical shutter array 50 conserves considerable power. Combined with the default opaque state for the common optical shutter 70 the invention provides all of the safety functions outlined above while minimizing optical power consumption. These are key advantages achieved by the invention.

Further advantages and details of these default states will be provided below in the operational section and particularly in relation to the flow charts shown in FIGS. 6 and 7.

Alternative Control Architecture

Figure 5:
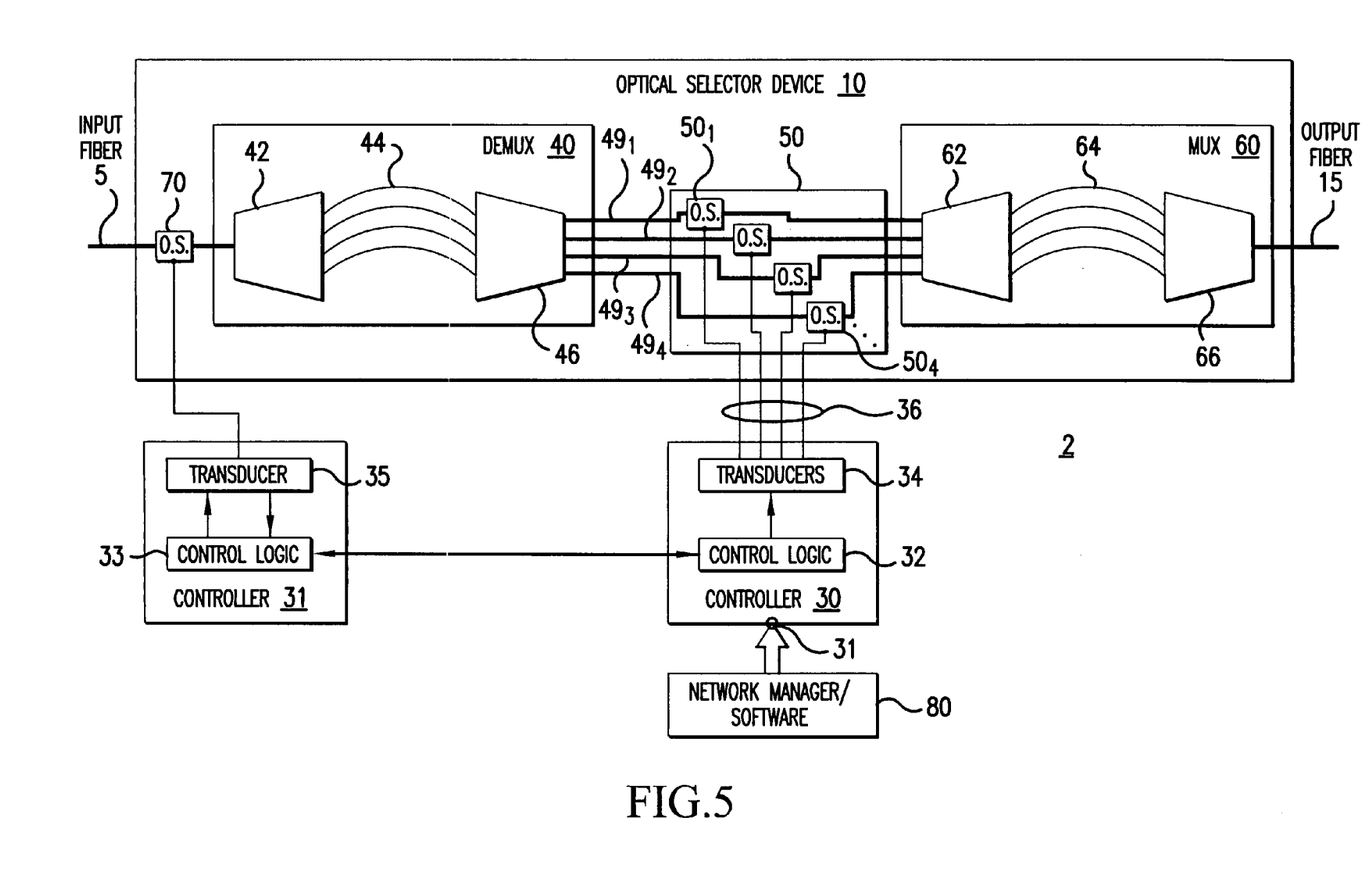
FIG. 5 is a block diagram of a reconfigurable wavelength blocking apparatus according to a second aspect of the invention and also further illustrating the details of the inventive optical selector device and an alternative control architecture.

FIG. 5 illustrates an alternative reconfigurable wavelength blocking apparatus 2 according to the invention that utilizes an alternative control structure. As shown therein, controller 31 is provided in addition to controller 30. Controller 31 may be constructed in the same fashion as controller 30. Indeed, both controllers 30, 31 may be provided separately as shown or may be combined within a single control module that combines the functionalities described below.

Controller 31 includes control logic 33 quite similar to control logic 32 of controller 30. Likewise, transducer 35 is constructed in a similar fashion to transducer 34. Indeed, transducer 35 may be combined with transducer 35 to provide a single transducer array.

Controller 31 is advantageous because it provides a way to separately monitor and control the common optical shutter 70. The goal is straightforward. When the transducers (35 or 34) fail, the corresponding control logic (33 or 32) detects such failure so that appropriate actions may be taken. Such failure can be detected through various means such a change in impedance, voltage or other characteristics.

When the control logic 32, 33 determines that the transducers 34, 35 have failed, the control logic 32, 33 decides that the common optical shutter 70 should be controlled such that it is in a blocking or opaque state. As discussed above, this is the default state for the common optical shutter 70 so that all that needs to be done is that power is shut off or not supplied to common optical shutter 70 when this condition occurs. In other words, transducer failure indicates a major problem for the reconfigurable wavelength blocking apparatus 2 according to the invention such that all wavelengths should be blocked by the common optical shutter 70. This avoids misrouted communications, overlap of conflicting channels downstream, etc. The goal of the alternative shown in FIG. 5 is to affect this control as quickly as possible which is done by acting on a single common optical shutter 70 instead of controlling each of the optical shutters in the array 50. In this way, significant time can be gained to affect this control and protect downstream components and wavelength channels.

OPERATION OF INVENTION

Although some general operation of the invention has been described above, more specific details of the inventive operation are described below in relation to the flow charts shown in FIGS. 6 and 7.

Figure 6:
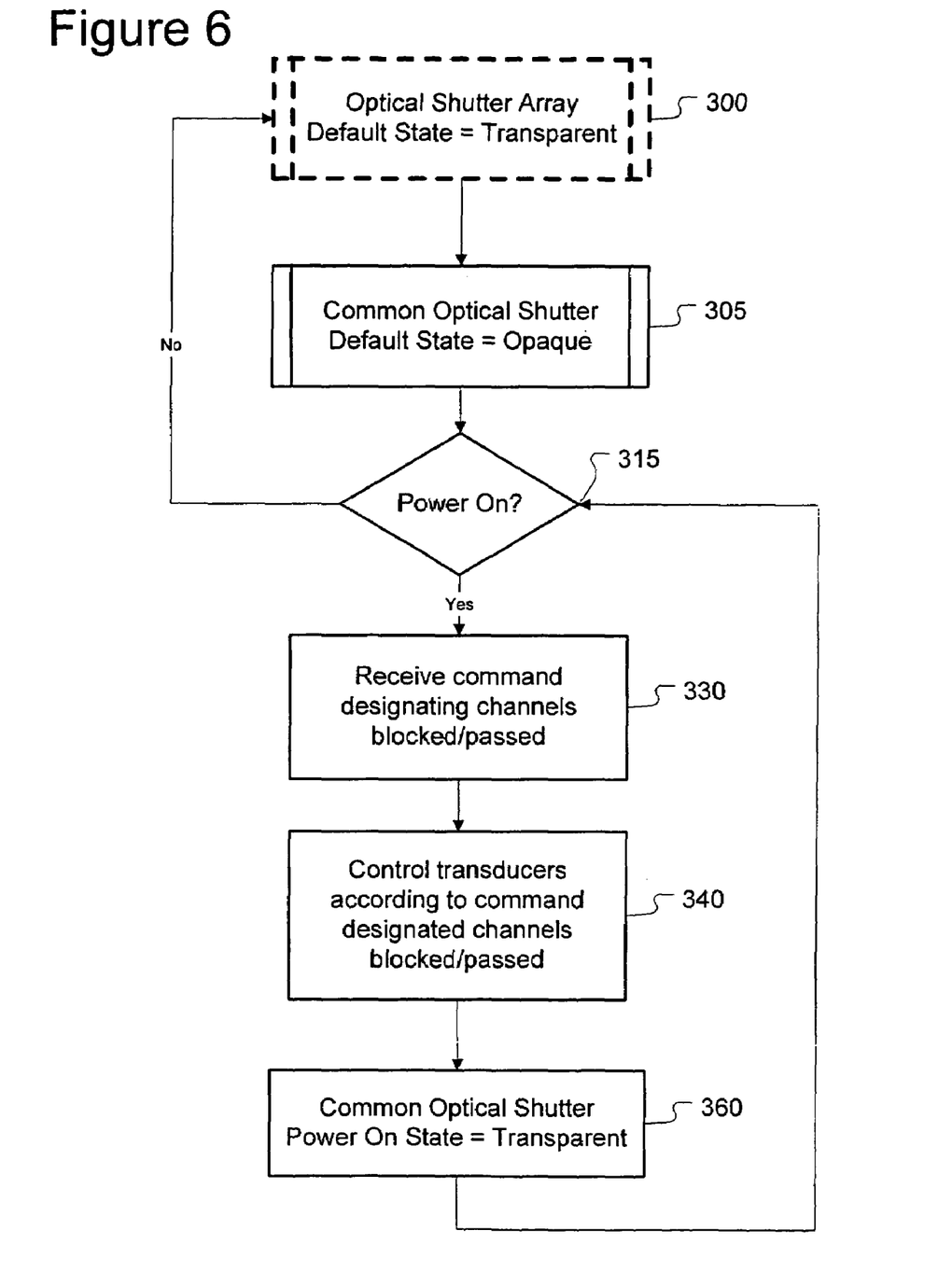
FIG. 6 is a flow chart illustrating the inventive operation of the reconfigurable wavelength blocking apparatus according to a first aspect of the invention.

FIG. 6 is the high-level flow chart of the operation of the invention particularly as it relates to the first aspect of the invention shown in FIG. 4. The flow chart of FIG. 6 may be implemented within the control logic 32 except the first two steps 300, 305 which are a result of the initial construction of the optical shutters used by the invention in optical shutter 50 array and in common optical shutter 70.

As shown in FIG. 6, the optical shutter array $50_n$ as a default state that is set to be a transparent state. Again, this default state is a result of the construction of the optical shutters $50_1 \ldots 50_n$ that are utilized to construct the optical shutter array 50. Likewise, the default state of opaque utilized for the common optical shutter in step 305 is a result of the construction of the common optical shutter 70. These are initial conditions as indicated by the flow chart of FIG. 6. It is important to note that the opaque default state (305) for the common optical shutter 70 is a key aspect due to the operational advantages discussed above. The default transparent state (300) for the optical shutter array 50 is considered optional as indicated by the dashed lines for step 300 in FIGS. 6 and 7: although it provides for power consumption advantages the operational advantages may be achieved via the default opaque state for the common optical shutter 70 regardless of the state of the shutter array 50.

As further shown in FIG. 6, the invention first decides (315) whether the apparatus 1, controller 30 and transducers are being supplied power. If so, the invention is ready to receive (330) one or more commands from the network manager 80 designating which channels should be blocked and which channels should be passed. Again, these commands and the granularity of the device are not limited to channels and, instead, bands or groups of channels may be designated as being blocked or passed.

In response to these commands, the invention controls (340) the transducers 34 driving the optical shutter array 50 according to the commands designating which channels should be blocked or passed.

After controlling the optical shutter array 50 to pass/block desired channels (bands), the invention may safely drive (360) the common optical shutter 70 into a transparent state transducers 34. In other words, when power is being supplied to the reconfigurable wavelength blocking apparatus 1 and the shutter array 50 has been set, the control logic 32 controls the transducers 34 to drive the common optical shutter 70 into a transparent state as indicated by step 360.

As further indicated by FIG. 6, the invention may loop or iterate this process by continually checking for a power-on state. Upon failure of power (power-on state is no) the common optical shutter 70 (and optionally, the optical shutter array) returns to the default state(s). Specifically, the common optical shutter 70 returns to a default state of opaque. Although not necessary for proper operation of the invention, the optical shutter array 50 will naturally return to a default state of transparent when power is no longer being supplied. The reasons and advantages for these default states are fully explained above.

Figure 7:
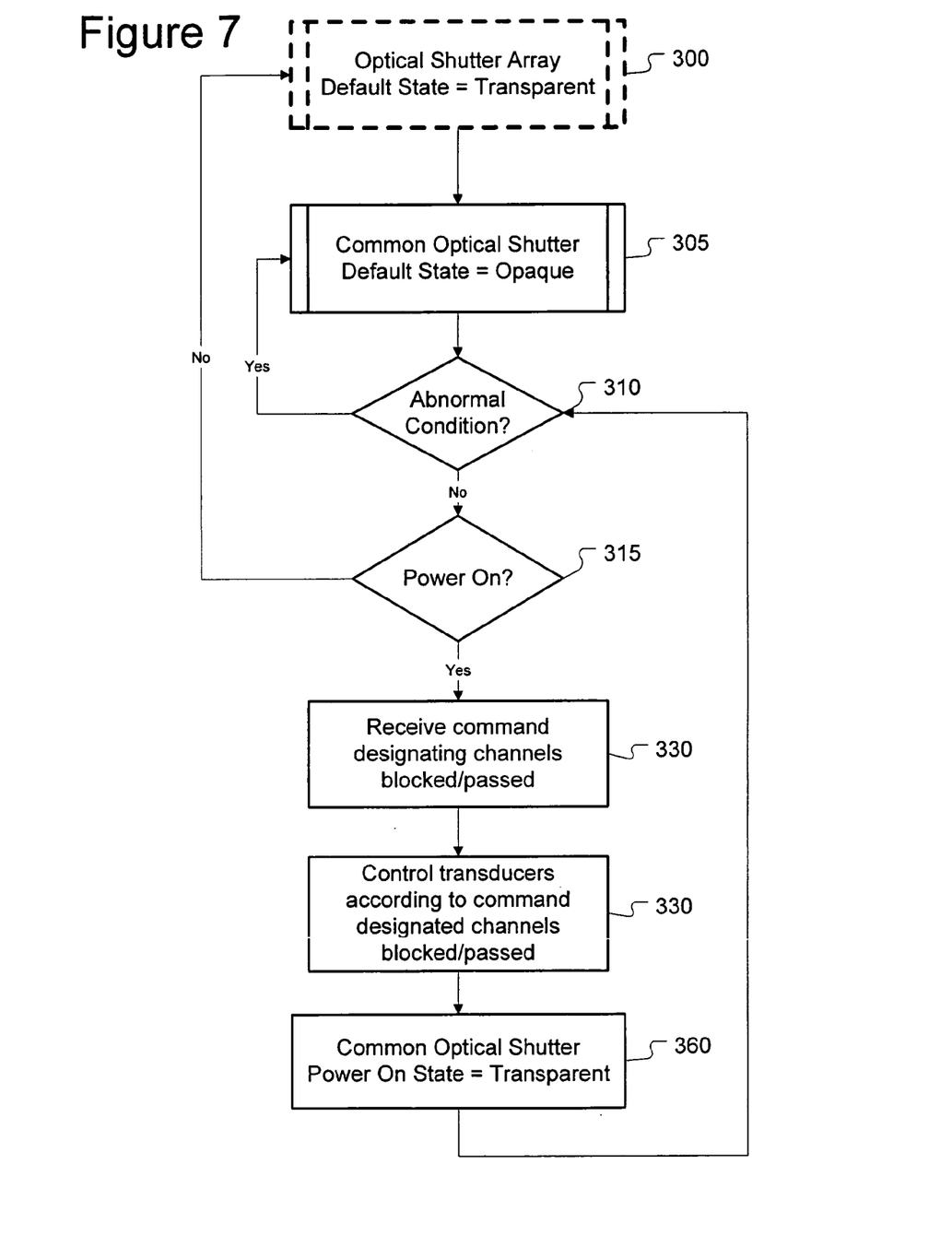
FIG. 7 is a flow chart illustrating the method of operation of the reconfigurable wavelength blocking apparatus according to the second aspect of the invention.

FIG. 7 illustrates further aspects of control according to the invention. The flow chart of FIG. 7 shares many of the same steps and functionality as FIG. 6 and a repetition of those functions will not be included below. Instead, the following description focuses upon the differences.

The main difference shown in FIG. 7 is the test (310) for an abnormal condition. This may be done in either of the embodiments 1, 2 of the reconfigurable wavelength blocking apparatus of the invention. The FIG. 5 embodiment may be slightly more applicable since it is the control of the common optical shutter 70 which is more important upon the detection of an abnormal condition.

The test (310) for an abnormal condition may include a variety of tests such as checking for a transducer (34 or 35) failure. Step 310 may determine if the reconfigurable wavelength blocking apparatus 1, 2 has failed in some other way such as a failure in the controller 30 or other component. Such abnormal conditions may also be detected by receiving an alarm or other indicator from the network manager 80 indicating that the reconfigurable blocking apparatus 1, 2 should be placed in a default (safe) state.

As shown in FIG. 7, upon detection of an abnormal condition as determined by test 310, the invention drives the common optical shutter 70 into a default opaque state. This may simply be done by turning off power supplied to the common optical shutter 70 by transducer 35 (or 34) such that the common optical shutter 70 returns to its default opaque state.

When the abnormal condition has been resolved, the invention returns to the normal operation flow which includes a test for a power-on condition and decision step 315. The rest of the operation is the same as shown in FIG. 6 except that the abnormal condition test (315) is included in each iteration as shown.

Figure 8:
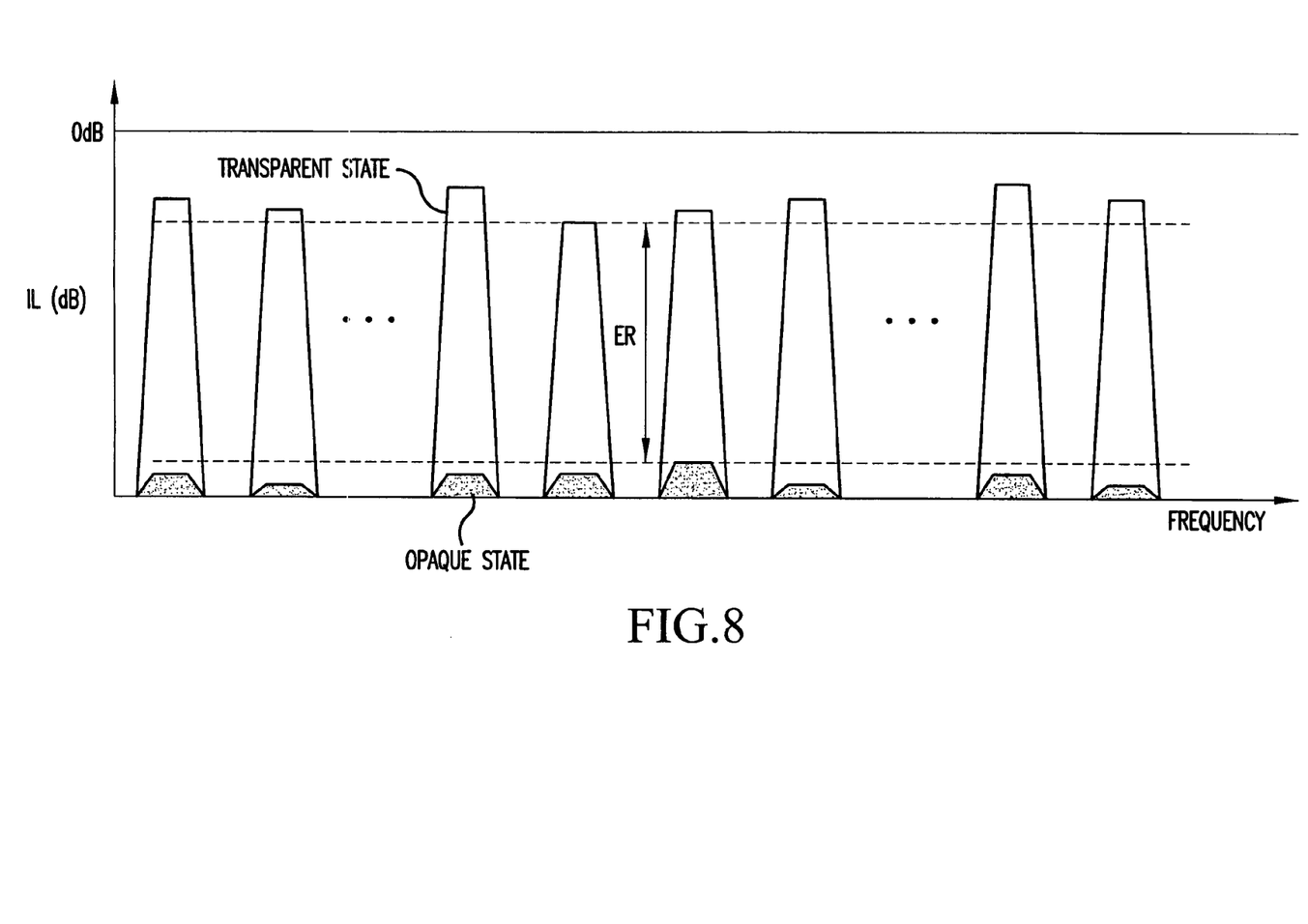
FIG. 8 is a graph of optical power versus frequency illustrating various wavelength channels, their selective transmission or blocking by the inventive apparatus as well as further illustrating the transparent and an opaque state for the optical shutters utilized by the invention.

FIG. 8 further illustrates the inventive operation. As shown therein, there is a graph of optical power versus frequency for a plurality of wavelength channels. FIG. 8 shows the output of the reconfigurable wavelength blocking apparatus 1, 2 of the invention. Specifically illustrated is the difference between the opaque and transparent states for the optical shutters $50_n$. More specifically, the opaque and transparent states for the optical shutters $50_n$ in the optical shutter array 50 is shown with the opaque state being the shaded, labeled state while the transparent state having a much greater optical power as indicated in the figure. The difference between the transparent and opaque states is otherwise known as the extinction ratio (ER) that is further illustrated in FIG. 8. By selectively controlling the optical shutters in array 50, the invention may provide either the transparent or opaque state for each of the wavelengths channels (bands) in the input WDM signal received by input fiber 5. When the common optical shutter 70 is permitted to return to its default state all of the channels would be blocked.

An alternative of the invention is a band-then-channel architecture. As noted above, the demultiplexer 40 and multiplexer 60 are not limited to single channel granularity. In other words, the demultiplexer 40 may demultiplex the WDM channels into bands or groups of channels. Such channel bands may be further demultiplexed by a second stage of the optical selector device. Particularly, the DEMUX 40 may demultiplex the WDM signal into multiple channel bands each of which may be selectively passed/blocked by optical shutter array 50. The output of the array 50 may then be fed to another demultiplexing stage (e.g. an AWG DEMUX like DEMX 40 could be coupled to waveguide 49n to demultiplex the channel band into individual channels).

This second stage of demultiplexing could also have arrays of optical shutters like array 50 to selectively pass/block individual channels on demand from controller 30. Common optical shutters like common shutter 70 could be provided at the input, output, both input and output of the apparatus or could be used mid-stage for greater isolation and control. It is important to note that by doing so one can selectively choose which group of bands need to be demultiplexed to the channel level. In other words, only when the traffic pattern in the network would require demultiplexing at the channel levels for all the bands would a second stage be used on every line. By not demultiplexing the bands that do not need to be, the problems associated with bandwidth reduction, ripple and PDL accumulations due to cascading effects are reduced, as the channels will see fewer demultiplex/multiplex stages.

A typical application of the invention is within an optical add/drop multiplexer (OADM) in which the reconfigurable wavelength blocking apparatus is placed along the express path of the OADM so as to selectively pass or block certain channels. Channels are typically blocked along the express path of an OADM in order to permit the insertion of wavelength channels having the same wavelength. More specifically, wavelength channels are typically dropped at an optical node which leaves that bandwidth available for the insertion of other data at the same wavelength.

A second, non-limiting, application is to reduce the operating costs of system upgrades and maintenance by adding the capability to block a selectable collection of channels at a node while equipment is being upgraded in the network. This can prevent the necessity of sending a human operator to a location to unplug fibers before making a change in the equipment. Even if an operator is present at a location where channels are being added or equipment upgraded, a reconfigurable channel blocking device can simplify the operation, speed it up, and reduce the chances for human error.

A third, non-limiting, application is in protection and preventative maintenance. The existence of a reconfigurable wavelength blocker can be used to protect downstream equipment and to provide assistance in recovery from equipment failures and fiber cuts. For example, it is possible that optical amplifiers or other optical components may be unsuited for the sudden loss of input light (an amplifier may transmit pure ASE (amplified spontaneous emission) light). In this case if the system software or alarms detect a fiber cut or equipment failure, it would be advantageous to have the ability to block light in those channels as quickly as possible.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed:

1. A reconfigurable wavelength blocking apparatus, comprising:
    a first arrayed waveguide grating demultiplexing an input WDM signal and outputting demultiplexed signals on respective outputs;
    an array of optical shutters optically coupled to the outputs from said first arrayed waveguide grating, each of the optical shutters in said array having a control input, wherein said array of optical shutters have a default state that is substantially transparent to the demultiplexed signals when no power is supplied to said array of optical shutters to minimize power consumption;
    a second arrayed waveguide grating optically coupled to said array of optical shutters, said second arrayed waveguide grating multiplexing optical signals output from said array to form a WDM signal;
    a common optical shutter optically coupled to either an input of said first and an output of said second arrayed waveguide gratings, said common optical shutter having a control input;
    said common optical shutter having a default state that is substantially opaque to the WDM signal when no power is supplied to said common optical shutter; and
    a controller operatively coupled to said array of optical shutters, said controller supplying control signals to the control inputs of said array in order to selectively drive each of the optical shutters in said array into a substantially transparent or opaque state in order to thereby select which WDM channels pass through and which WDM channels are blocked by said array;

wherein said default state of said array of optical shutters and said default state of said common optical shutter are operable to prevent duplication of a wavelength channel and provide fault isolation and signaling while minimizing power consumption.

2. The reconfigurable wavelength blocking apparatus according to claim 1,
said controller operatively coupled to the control input of said common optical shutter,
said controller also supplying a control signal to said common optical shutter to drive the common optical shutter from its default opaque state to a substantially transparent state during normal operation.

3. The reconfigurable wavelength blocking apparatus according to claim 2,
said controller supplying a control signal to said common optical shutter to drive the common optical shutter from its substantially transparent state to the default opaque state during abnormal operation.

4. The reconfigurable wavelength blocking apparatus according to claim 1,
said controller including:
transducers operatively connected to control inputs of said array of optical shutters,
control logic operatively connected to said transducers and to a control signal input port,
said control logic generating logic signals indicative of which optical shutters in said array should be placed into a substantially transparent or opaque state according to the control signal received via the control signal input port;
said transducer outputting driving signals to drive the optical shutters in said array to thereby select which WDM channels pass through and which WDM channels are blocked by said array.

5. The reconfigurable wavelength blocking apparatus according to claim 1, said common optical shutter being a first common optical shutter optically coupled to said first arrayed waveguide grating, said first common optical shutter having a control input, the apparatus further comprising:
a second common optical shutter optically coupled to said second arrayed waveguide gratings, said second common optical shutter having a control input,
said first and second common optical shutters having a default state that is substantially opaque to the WDM signal when no power is supplied to said first and second common optical shutter.

6. The reconfigurable wavelength blocking apparatus according to claim 5,
said controller operatively coupled to control inputs of said first and second common optical shutters,
said controller also supplying a control signal to said first and second common optical shutter to drive said first and second common optical shutters from their default opaque state to a substantially transparent state during normal operation.

7. The reconfigurable wavelength blocking apparatus according to claim 1,
wherein said first arrayed waveguide grating, said array of optical shutters, said common optical shutter, and said second arrayed waveguide grating are formed as a planar lightwave circuit on a single substrate.

8. The reconfigurable wavelength blocking apparatus according to claim 1,
wherein the reconfigurable wavelength blocking apparatus is arranged on a single substrate.

9. The reconfigurable wavelength blocking apparatus according to claim 1,
wherein each of the optical shutters in said array and said common optical shutter are constructed with a 2-stage Mach-Zehnder interferometer.

10. The reconfigurable wavelength blocking apparatus according to claim 1,
said first arrayed waveguide grating demultiplexing the input WDM signal into single wavelength channels and outputting demultiplexed wavelength channels on respective outputs.

11. The reconfigurable wavelength blocking apparatus according to claim 1,
said first arrayed waveguide grating demultiplexing the input WDM signal into wavelength channel bands and outputting demultiplexed wavelength channel bands on respective outputs.

12. An optical selector device, comprising:
a first arrayed waveguide grating demultiplexing an input WDM signal and outputting demultiplexed signals on respective outputs;
an array of optical shutters optically coupled to the outputs from said first arrayed waveguide grating, said array of optical shutters having a default state that is substantially transparent to the demultiplexed signals when no power is supplied to said array of optical shutters;
a second arrayed waveguide grating optically coupled to said array of optical shutters, said second arrayed waveguide grating multiplexing optical signals output from said array to form a WDM signal; and
a common optical shutter optically coupled to either an input of said first and an output of said second arrayed waveguide gratings, said common optical shutter having a control input;
said common optical shutter having a default state that is substantially opaque to the WDM signal when no power is supplied to said common optical shutter;
wherein said default state of said array of optical shutters and said default state of said common optical shutter are operable to prevent duplication of a wavelength channel and provide fault isolation and signaling while minimizing power consumption.

13. The optical selector device according to claim 12,
wherein said first arrayed waveguide grating, said array of optical shutters, said common optical shutter, and said second arrayed waveguide grating are formed as a planar lightwave circuit on a single substrate.

14. The optical selector device according to claim 12,
wherein each of the optical shutters in said array and said common optical shutter are constructed with a 2-stage Mach-Zehnder interferometer.

15. The optical selector device according to claim 12,
said first arrayed waveguide grating demultiplexing the input WDM signal into single wavelength channels and outputting demultiplexed wavelength channels on respective outputs.

16. The optical selector device according to claim 12,
said first arrayed waveguide grating demultiplexing the input WDM signal into wavelength channel bands and outputting demultiplexed wavelength channel bands on respective outputs.

17. A reconfigurable wavelength blocking apparatus, comprising:
the optical selector device according to claim 12; and
control means for supplying control signals to control inputs of said array in order to selectively drive the optical shutters in said array into a substantially transparent or opaque state in order to thereby select which WDM channels pass through and which WDM channels are blocked by said array.

* * * * *